US007310820B2

(12) United States Patent
Tada

(10) Patent No.: US 7,310,820 B2

(45) Date of Patent: Dec. 18, 2007

(54) RECORDING AND REPRODUCING APPARATUS

(75) Inventor: Nobuyuki Tada, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 763 days.

(21) Appl. No.: 10/657,156

(22) Filed: Sep. 9, 2003

(65) Prior Publication Data

US 2004/0064717 A1 Apr. 1, 2004

(30) Foreign Application Priority Data

Sep. 13, 2002 (JP) ............................ 2002-268713

(51) Int. Cl.
*G06F 17/30* (2006.01)

(52) U.S. Cl. ............................ 726/26; 726/27; 726/31; 726/32; 726/33

(58) Field of Classification Search ............ 726/26-27, 726/31-33; 713/168
See application file for complete search history.

(56) References Cited

U.S. PATENT DOCUMENTS 4,961,088 A * 10/1990 Gilliland et al. .............. 399/25
5,418,763 A * 5/1995 Ichikawa et al. ............. 369/84
6,038,200 A * 3/2000 Ozue et al. .............. 369/30.29
7,006,995 B1 * 2/2006 Edenson et al. .............. 705/51

FOREIGN PATENT DOCUMENTS

JP 2001-332064 A 11/2001

* cited by examiner

*Primary Examiner*—Hosuk Song
(74) *Attorney, Agent, or Firm*—Sughrue Mion Pllc.

(57) ABSTRACT

A recording and reproducing apparatus having a recording medium and cartridge memory inside a cartridge and making a copy of control information memorized in said cartridge memory recorded, in which control information memorized in the cartridge memory is compared with one recorded in the recording medium, thereby a recording or reproducing operation of the apparatus is selected based on the compared result. Moreover in the apparatus, a password is memorized in the cartridge memory in advance and an authentication is made with the password being input through an external input means, thereby its recording or reproducing operation is selected based on the authenticated result.

23 Claims, 5 Drawing Sheets

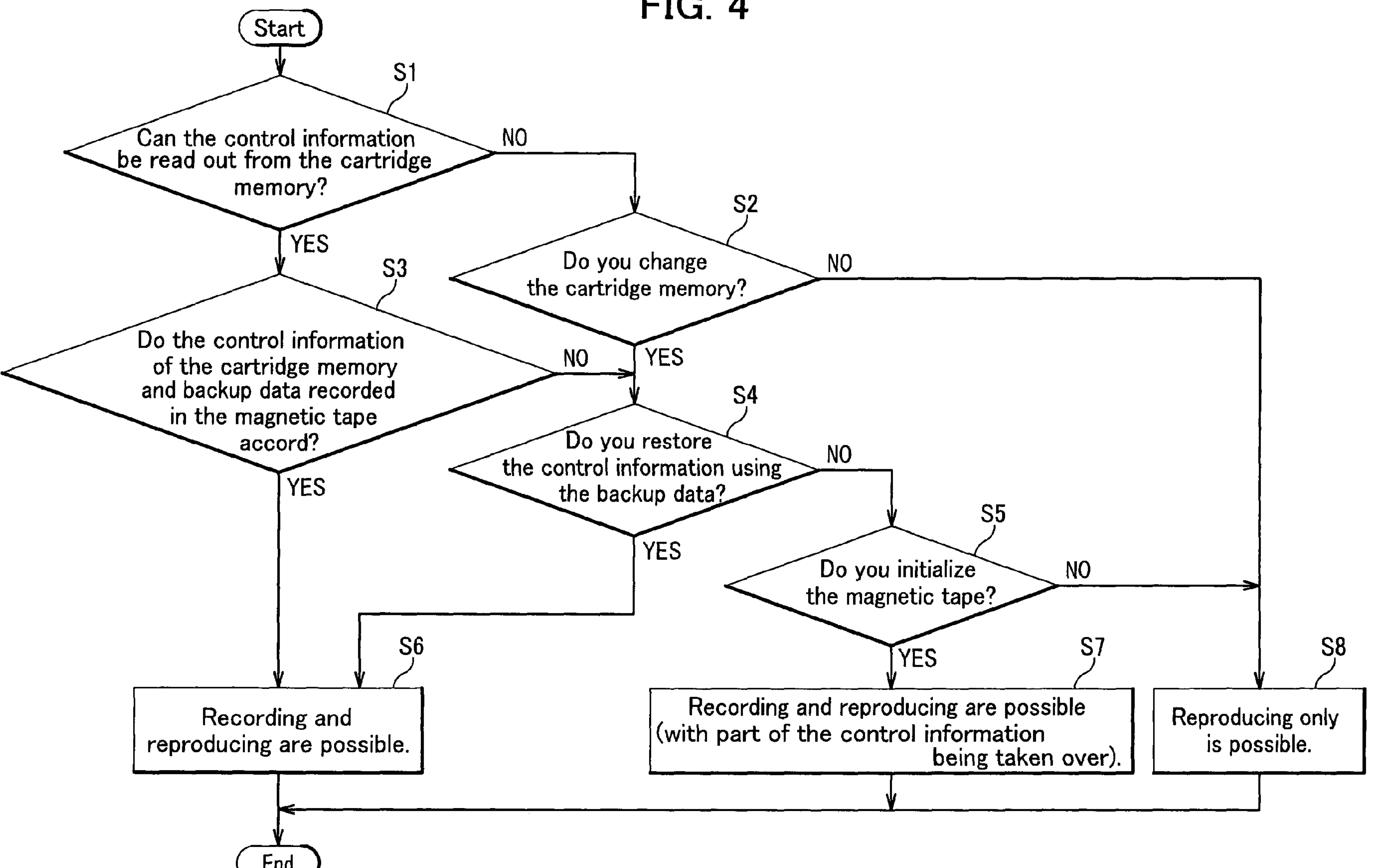
FIG. 4
Start
S1
Can the control information be read out from the cartridge memory?
YES
NO
S2
Do you change the cartridge memory?
NO
YES
S3
Do the control information of the cartridge memory and backup data recorded in the magnetic tape accord?
NO
YES
S4
Do you restore the control information using the backup data?
NO
YES
S5
Do you initialize the magnetic tape?
NO
YES
S6
Recording and reproducing are possible.
S7
Recording and reproducing are possible (with part of the control information being taken over).
S8
Reproducing only is possible.
End

RECORDING AND REPRODUCING APPARATUS

FIELD OF THE INVENTION

The present invention relates to a recording medium cartridge with a cartridge memory and a recording/reproducing method therefor.

BACKGROUND OF THE INVENTION

Conventionally, a recoding medium cartridge with a recording medium such as a magnetic tape is provided with a cartridge memory to memorize control information (administrative information) such as manufacture information like a manufacturer and manufacture number, and usage history information like a user and usage date. Because such the cartridge memory can send/receive a signal and electric power with no contact to an outside of the cartridge memory by electromagnetic induction, it is housed in a cartridge case of the recording medium cartridge (for example, see in page 2 and FIGS. 7 and 8 of Japan patent laid open publication 2001-332064).

Meantime, a cartridge memory of a conventional recording medium cartridge has a problem that a recording/reproducing apparatus cannot record/reproduce such data in a recording medium if the control information cannot be read due to damage or degradation.

SUMMARY OF THE INVENTION

An exemplary object of the present invention is to provide a recording/reproducing apparatus which can reproduce recorded content of a recording medium if control information cannot be read due to an occurrence of damage or degradation.

The recording/reproducing apparatus of a recording medium cartridge with the recording medium and cartridge memory inside a cartridge, in which a copied control information memorized in the cartridge memory is made to be recorded in the recording medium, is characterized in that the apparatus is composed so as to compare the control information memorized in the cartridge memory with one recorded in the recording medium, thereby selecting a recording/reproducing operation of the apparatus based on the compared result.

According to the recording/reproducing apparatus, the control information memorized in the cartridge memory inside the recording medium cartridge inserts a recording medium cartridge copied in the recording medium into the apparatus and compares the control information memorized in the cartridge memory with one copied in the recording medium, thereby the apparatus being able to record/reproduce by being controlled based on the control information recorded in the recording medium if the control information cannot be read out of the cartridge memory.

BRIEF DESCRIPTION OF THE DRAWINGS

FIG. 4 is a flow chart showing processings of control information in a recording/reproducing apparatus.

FIG. 5A is a case recorded at a top end portion; FIG. 5B is a case recorded by being divided; FIG. 5C is a case recording the backup data neighboring data; and FIG. 5D is a case recording all data every time when the backup data is updated.

DESCRIPTION OF THE PREFERRED EMBODIMENTS

One of the embodiments related to the present invention is described in detail hereinafter referring to drawings as needed. Meanwhile, the embodiment assumes a case in which a magnetic tape cartridge is used as a recording medium cartridge.

Figure 1:
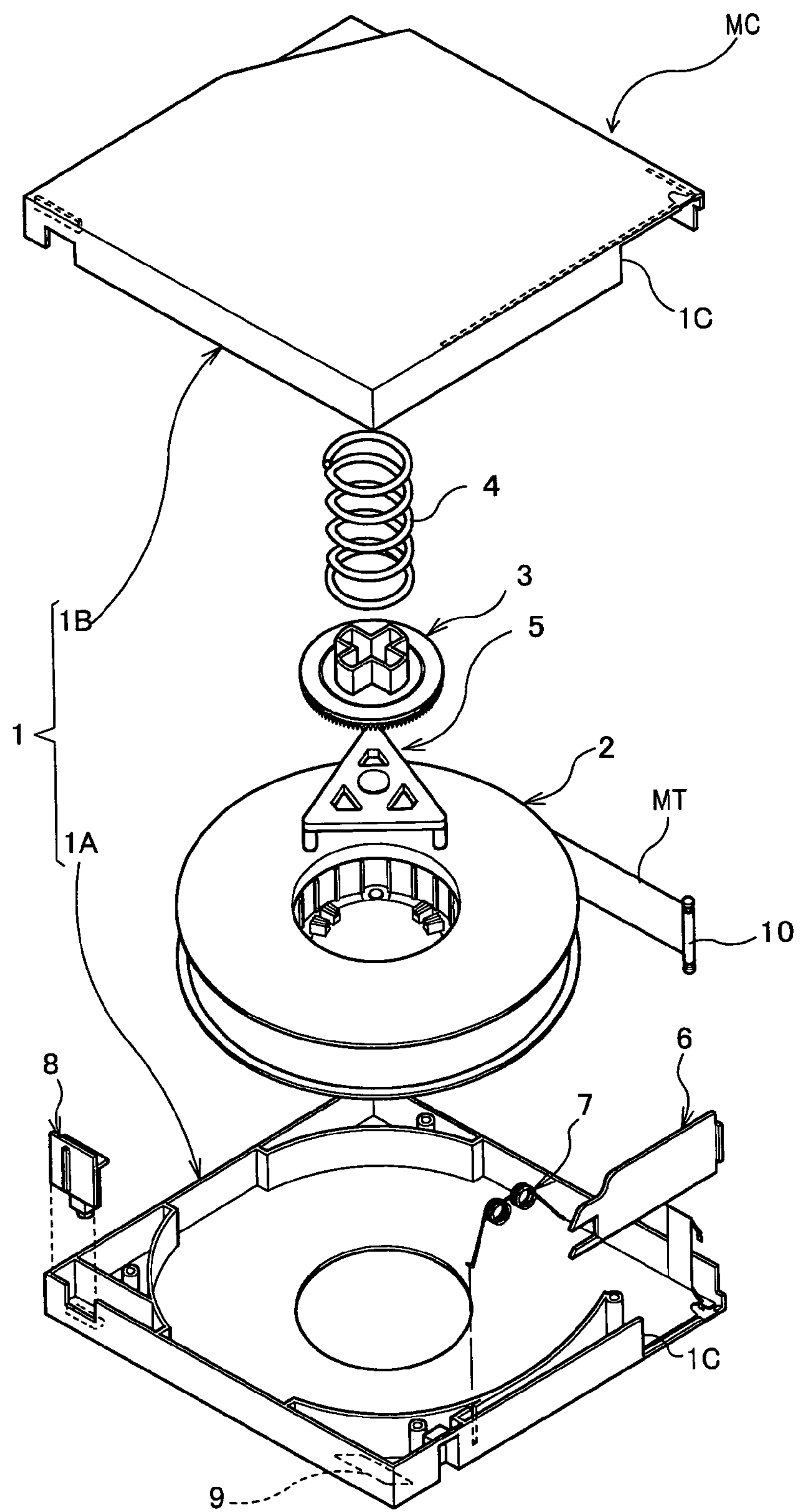
FIG. 1 is an exploded perspective view showing a configuration of a magnetic tape cartridge related to the embodiment.
Figure 2A:
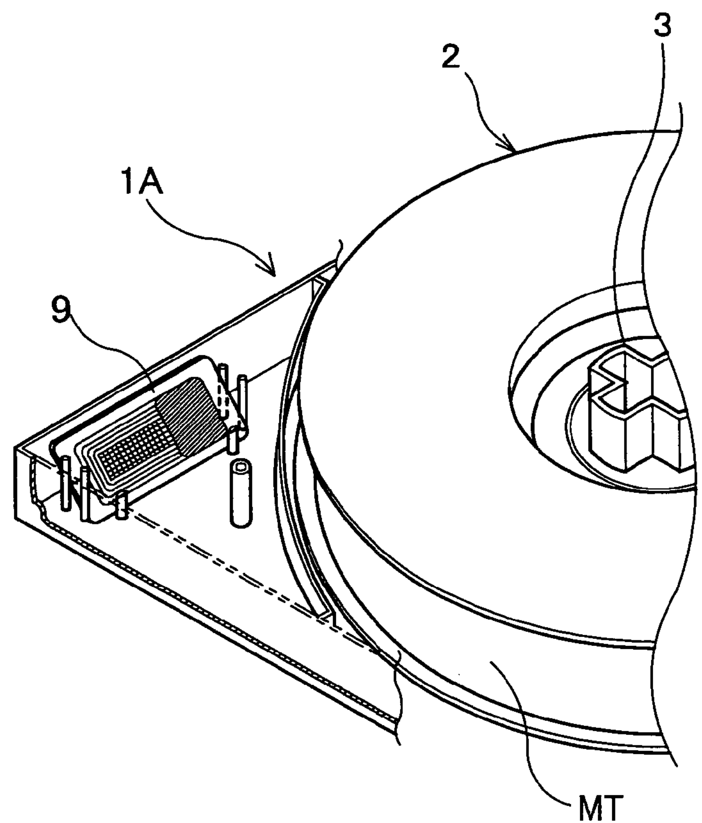
FIG. 2A is a perspective view showing a situation in which a cartridge memory is attached to a lower half of a cartridge case.

Firstly, a configuration of the magnetic tape cartridge related to the invention is described referring to FIGS. 1 and 2.

As shown in FIG. 1, a magnetic tape cartridge MC is composed of a single reel 2 in which a magnetic tape MT which is a recording medium is wound, a leader pin 10 to pull out the magnetic tape MT from a cartridge case 1, a lock plate 3 and compressing spring 4 to lock a rotation of the reel 2, a release pad 5 to unlock the reel 2, a slide door 6 to open/close a magnetic tape pulling-out port 1C formed over a lower half 1A and upper half 1B, a coiled spring 7 energizing the slide door 6 to a closing position of the magnetic tape pulling-out port 1C, a prevention claw 8 for an involuntary delete, a cartridge memory 9, and the like built in the cartridge case 1 which is divided into the lower half 1A and upper half 1B. Meanwhile, the cartridge memory 9 is arranged at a corner of the lower half 1A of the cartridge case 1 not to impede a travel of the magnetic tape MT (see FIG. 2A).

Figure 2B:
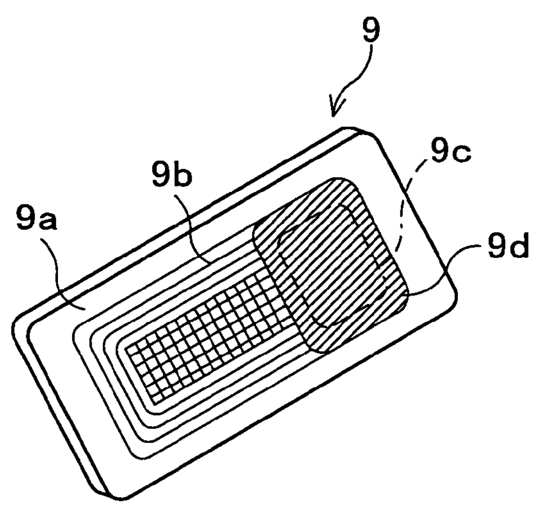
FIG. 2B is a perspective view showing an appearance of the cartridge memory.

As shown in FIG. 2B, the cartridge memory 9 is formed as a rectangular sheet, and a loop antenna **9*b* and IC chip 9*c* are provided on a board 9*a* made of resin. The IC chip 9*c* is protected by being sealed in a globe top 9*d* formed of resin. The chip 9*c* is electrically connected with the loop antenna 9*b* and data is sent/received to and from an outside of the magnetic tape cartridge MC by propagating electromagnetic waves to the antenna 9*b* from the outside of the magnetic tape cartridge MC. A power source to drive the chip 9*c* is also supplied from the outside of the tape cartridge MC by propagating the electromagnetic waves. In the cartridge memory 9**, control information (administrative information) such as a usage history of the magnetic tape MT and a serial number, manufacturer, user, and format type of the tape cartridge MC is memorized.

Figure 5A:
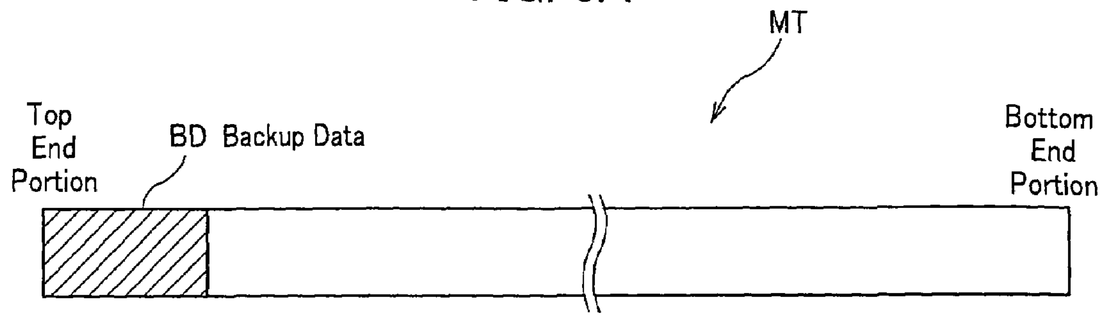
FIGS. 5A, 5B, 5C, and 5D show examples of recorded positions of backup data.

In the magnetic tape MT, backup data of the control information memorized in the cartridge memory 9 is recorded so as to reproduce the tape MT with a recording/reproducing apparatus if the control information cannot be read due to damage or degradation. FIGS. 5A, 5B, 5C, and 5D are drawings in which recorded positions of backup data are shown in unfolded states. Meanwhile, in FIGS. 5A, 5B, 5C, and 5D, tracks are shown as one for convenience. Although recording places of the backup data are not specifically restricted, it is preferable to record the data at a longitudinal top end portion of the tape MT as shown in FIG. 5A. By recording at the top end portion like this, whenever loading the magnetic tape cartridge MC in the recording/ reproducing apparatus, the backup data can be read without practically winding the tape MT.

Figure 5B:
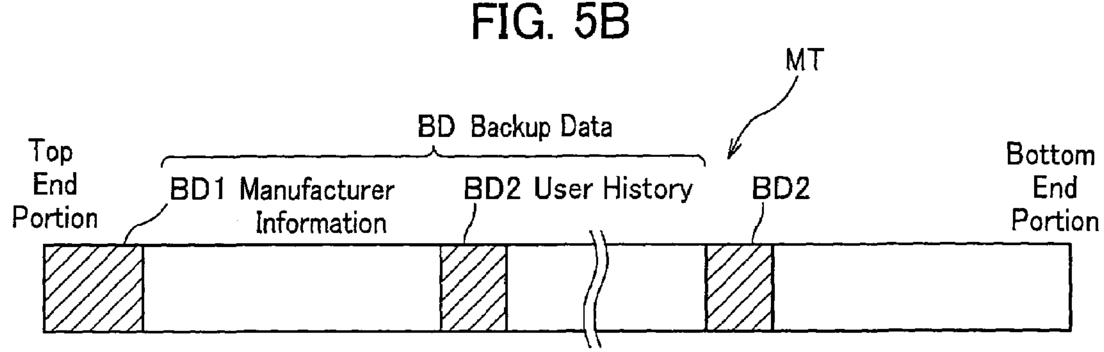

Moreover, as shown in FIG. 5B, information which is not updated in a backup data BD, for example, such as a manufacturer information BD1, may be recorded at the top end portion, whereas information which is updated, for example, such as a user history BD2, may be recorded at a different portion other than the top end portion. By performing like this, it is not necessary to rewind the tape MT whenever updating the backup data BD, thereby being able to prevent an access speed from being reduced. Meanwhile, other portions described here may be one or plural places.

Figure 5C:
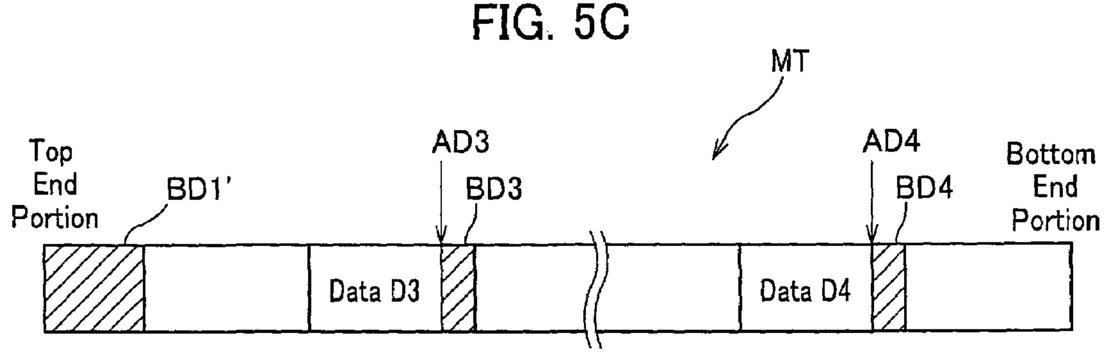
Figure 5D:
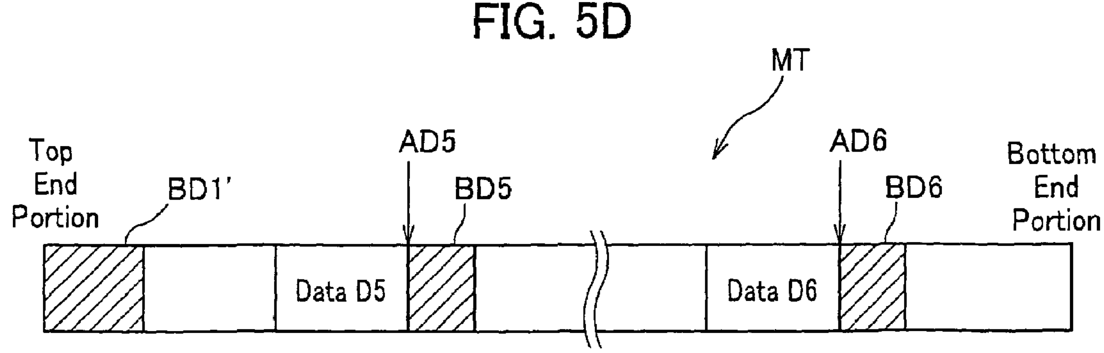

Furthermore, when dividing the backup data and recording it, it may be recorded in a position of the tape MT determined in advance or can also be recorded in a position determined according to content of the backup data BD. Particularly, when the content of data recorded in the tape MT and that of the backup data have a connection, as shown in FIG. 5C, it is better to record connecting backup data BD3 and BD4 at neighboring positions of written data D3 and D4. By performing like this, when recording the backup data BD3 and BD4 and referring to them, lowering of access speed to the data can be prevented. Meanwhile, when dividing and recording the backup data BD, in the backup data BD (for example, a backup data BD 1' at a top end portion) fragmented information, that is, addresses AD3 and AD4 showing positions of divided backup data BD3 and BD4 are made to be included.

Without dividing the backup data BD, it may be better to make all of backup data BD5 and BD6 included in their version information and/or time stamps, which neighbor positions in which data D5 and D6 are written, and to record the data BD5 and BD6. In this case, record addresses (for example, AD5 and AD 6 in FIG. 5D), in which newest backup data addresses BDn exist, in the cartridge memory 9 and the backup data BD1' at the top end portion of the tape MT. Like this, if content of all backup data is recorded whenever the backup data BDn is recorded, the data BDn can be used by searching all of the data BDn on the tape MT and judging the newest backup data based on the version information or time stamps if whereabouts of the data BDn becomes unknown due to some trouble.

Figure 3:
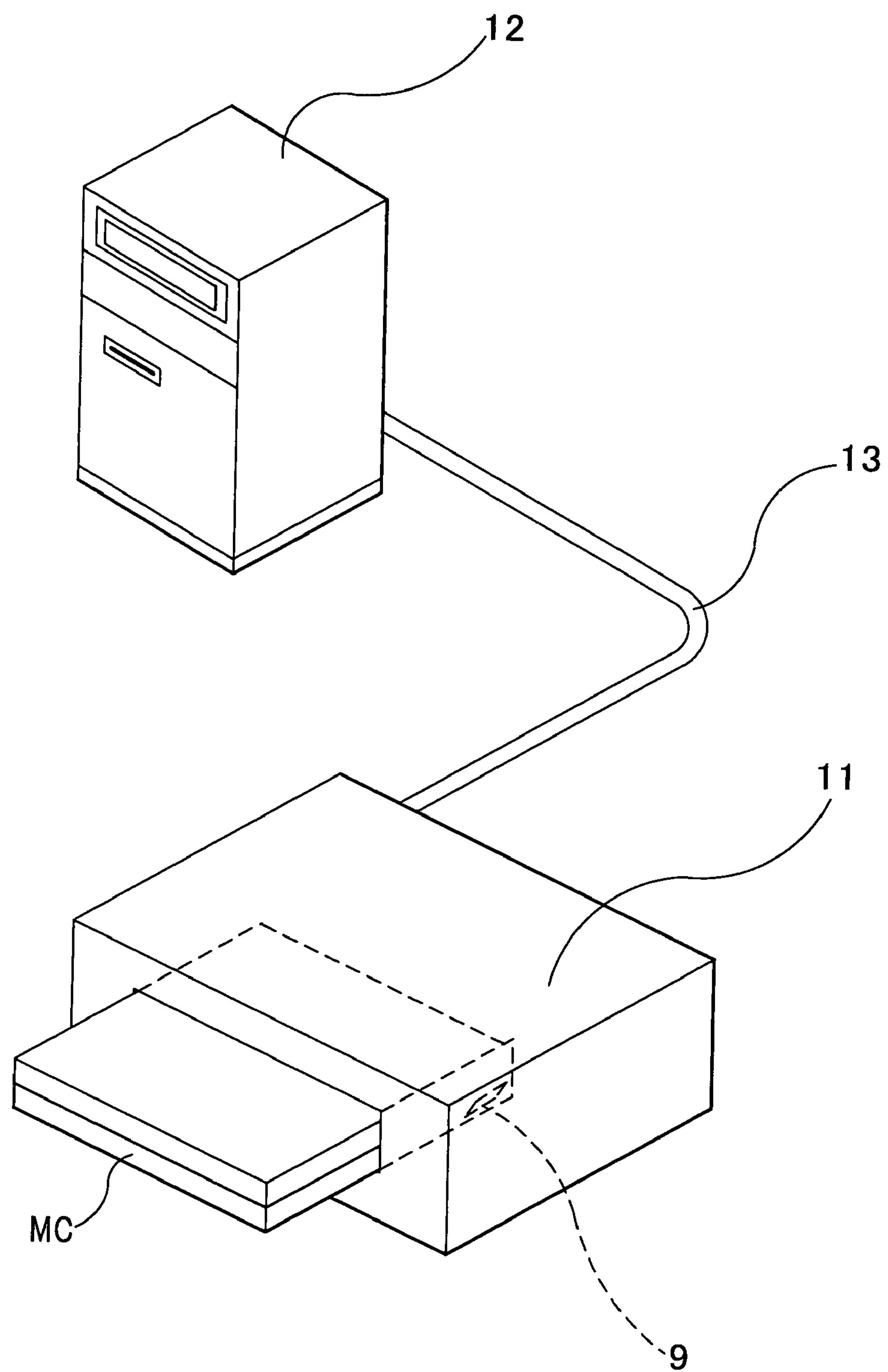
FIG. 3 is a perspective view showing a recording/reproducing apparatus which records/reproduces a magnetic tape cartridge.

A recording/reproducing apparatus 11 to record/reproduce such the magnetic tape cartridge MC is provided inside with a magnetic tape driving circuit, input/output interface circuit, power source, and the like, and is connected with an external computer 12 via a cable 13 (see FIG. 3). If the tape cartridge MC is inserted in the recording/reproducing apparatus 11, it is composed so as to compare the control information memorized in the cartridge memory 9 with the backup data recorded in the magnetic tape MT. The apparatus 11 can be operated based on a compared result of the control information in the cartridge memory 9 and backup data, and recording/reproducing is possible in the magnetic tape MT based on an instruction of recording/reproducing via the external computer 12 using the apparatus 11.

To be more precise, if the control information of the cartridge memory 9 and the backup data of the magnetic tape MT do not accord, the recording/reproducing apparatus 11 is controlled so as to initialize the tape MT or only reproduce based on the backup data of the tape MT.

Moreover, if the control information of the cartridge memory 9 cannot be read in its insertion into the recording/reproducing apparatus 11, the apparatus 11 is limited so as to only reproduce based on the backup data of the magnetic tape MT. Accordingly, an operation of the computer 12 is restricted only to read content recorded in the tape MT.

On the other hand, if the control information of the cartridge memory 9 and the backup data of the magnetic tape MT accord, the recording/reproducing apparatus 11 records/reproduces the tape MT based on the control information or backup data via an instruction of the computer 12.

Meanwhile, with a password being memorized in the control information of the cartridge memory 9 in advance, a user of the magnetic tape cartridge MC make an authentication inputting the password through the computer 12 and only if the input password accords, a recording/reproducing operation may also be possible.

Then, an operation in recording/reproducing the magnetic tape cartridge MC by the recording/reproducing apparatus 11 is described referring to a flow chart shown in FIG. 4.

Firstly, as shown in FIG. 4, if the magnetic tape cartridge MC is inserted in the recording/reproducing apparatus 11 (see FIG. 3), the apparatus 11 reads out control information of the magnetic tape MT memorized in the cartridge memory 9 (S1).

In the S1, if the control information cannot be read (No in the S1), make a user select whether or not he/she changes the cartridge memory 9 (S2).

In the S2, if unchanging the cartridge memory 9 is selected (No in the S2), the recording/reproducing apparatus 11 only reproduces over the whole length of the magnetic tape MT based on backup data (S8).

In the S2, if changing the cartridge memory 9 is selected (Yes in the S2), make the user select whether or not he/she restores the control information in the cartridge memory 9 which is changed using the backup data recorded in the magnetic tape MT in advance (S4).

In the S4, if unrestoring the backup data is selected (No in the S4), make the user select whether or not he/she initializes the magnetic tape MT (S5).

Then, in the S5, if uninitializing the magnetic tape MT is selected (No in the S5), the recording/reproducing apparatus 11 only reproduces over the whole length of the magnetic tape MT based on the backup data (the S8).

On the other hand, in the S5, if initializing the magnetic tape MT is selected (Yes in the S5), the recording/reproducing apparatus 11 takes over part of the control information, thereby enabling the magnetic tape MT to be recorded/reproduced (S7).

In the S4, if restoring the backup data is selected (Yes in the S4), the recording/reproducing apparatus 11 restores the backup data in the cartridge memory 9 and can record/reproduce over the whole length of the magnetic tape MT based on the control information (S6).

In the S1, if the control information can be read (Yes in the S1), the control information of the cartridge memory 9 is compared with the backup data of the magnetic tape MT (S3).

In the S3, if the control information and backup data do not accord (No in the S3), make the user select whether or not he/she restores the backup data in the cartridge memory 9 in the S4. According to a result in the S4, in case of restoring (Yes in the S4), the recording/reproducing apparatus 11 can record/reproduce the magnetic tape MT (the S7).

On the other hand, in case of unrestoring (No in the S4), make the user select whether or not he/she initializes the magnetic tape MT (the S5). In case of initializing (Yes in the S5), the recording/reproducing apparatus 11 takes over part of the control information and can record/reproduce the magnetic tape MT (the S7). In case of uninitializing (No in the S5), the recording/reproducing apparatus 11 can only reproduce the magnetic tape MT.

Moreover, in the S3, if the control information of the cartridge memory 9 and backup data accord by being compared (Yes in the S3), the recording/reproducing apparatus 11 can record/reproduce the magnetic tape MT (the S6).

As described above, even in case of an occurrence of a trouble and/or damage and the like, because memorized information of the cartridge memory 9 is recorded in the magnetic tape MT as the backup data, the recording/reproducing apparatus 11 can reproduce at least a magnetic tape cartridge based on the backup data.

Moreover, in the case of an occurrence of a trouble and/or damage and the like, composing the cartridge memory 9 as changeable enables the backup data recorded in the magnetic tape MT to be memorized in the cartridge memory 9 which is changed using the recording/reproducing apparatus 11. In this connection, the backup data of the magnetic tape MT is memorized in the cartridge memory 9, so administrative and control information of the magnetic tape MT such as a usage history and reproduction numbers of time can be taken over.

Furthermore, the magnetic tape cartridge MC and recording/reproducing apparatus 11 of the invention compare the control information memorized in the cartridge memory 9 in the case of an insertion of the magnetic tape cartridge MC in the apparatus 11 with the backup data recorded in the magnetic tape MT, thereby being able to control a recording/reproducing operation of the apparatus 11 according to a compared result.

Although the embodiment uses a magnetic tape cartridge, it does not restrict the invention and, fro example, recording medium cartridges such as a video tape cartridge, optical tape cartridge, magnetic disk cartridge, and optical disk cartridge are also available.

What is claimed is:

1. A recording and reproducing apparatus, the apparatus comprising:

a recording medium and a cartridge memory inside a cartridges, wherein a copy of control information memorized in said cartridge memory is recorded in said recording medium, wherein the control information memorized in said cartridge memory is compared with the control information recorded in said recording medium, thereby a recording or reproducing operation of said apparatus is based on the compared result.

2. A recording and reproducing apparatus according to claim 1, wherein a password is memorized in said cartridge memory in advance and an authentication is made with said password being input through an external input means, thereby a recording or reproducing operation of said apparatus is selected based on the authenticated result.

3. A recording and reproducing apparatus according to claim 1, wherein when control information memorized in said cartridge memory and control information recorded in said recording medium accord, said recording medium is recorded and reproduced, and wherein when the control information memorized in said cartridge memory and the control information recorded in said recording medium do not accord, said recording medium is initialized or only reproduced.

4. A recording and reproducing apparatus according to claim 2, wherein when control information memorized in said cartridge memory and control information recorded in said recording medium accord, said recording medium is recorded and reproduced, and wherein when the control information memorized in said cartridge memory and the control information recorded in said recording medium do not accord, said recording medium is initialized or only reproduced.

5. A recording and reproducing apparatus according to claim 1, wherein when control information memorized in said cartridge memory and control information recorded in said recording medium do not accord, the control information recorded in said recording medium is written in the cartridge memory.

6. A recording and reproducing apparatus according to claim 2, wherein when control information memorized in said cartridge memory and control information recorded in said recording medium do not accord, the control information recorded in said recording medium is written in the cartridge memory.

7. A recording and reproducing apparatus according to claim 1, wherein when control information memorized in said cartridge memory cannot be read, said recording medium is only reproduced.

8. A recording and reproducing apparatus according to claim 2, wherein when control information memorized in said cartridge memory cannot be read, said recording medium is only reproduced.

9. A recording and reproducing apparatus according to claim 1, wherein when said cartridge memory is changed, control information recorded in said recording medium is written in a changed cartridge memory.

10. A recording and reproducing apparatus according to claim 2, wherein when said cartridge memory is changed, control information recorded in said recording medium is written in a changed cartridge memory.

11. A recording and reproducing apparatus according to claim 1, wherein said recording medium is a magnetic tape.

12. A recording and reproducing apparatus according to claim 1, wherein said recording medium is an optical recording tape.

13. A recording and reproducing apparatus according to claim 11, wherein said control information is recorded at a top portion of longitudinal direction of said magnetic tape.

14. A recording and reproducing apparatus according to claim 12, wherein said control information is recorded at a top portion of longitudinal direction of said magnetic tape.

15. A recording and reproducing apparatus according to claim 11, wherein information not updated in said control information is recorded at a top portion of longitudinal direction of said magnetic tape, and wherein information updated in said control information is recorded at a portion other than the top portion of longitudinal direction of said magnetic tape.

16. A recording and reproducing apparatus according to claim 12, wherein information not updated in said control information is recorded at a top portion of longitudinal direction of said magnetic tape, and wherein information updated in said control information is recorded at a portion other than the top portion of longitudinal direction of said optical recording tape.

17. A recording and reproducing apparatus according to claim 11, herein when recording said control information, the control information is recorded at a position of said magnetic tape determined in advance.

18. A recording and reproducing apparatus according to claim 12, wherein when recording said control information, the control information is recorded at a position of said optical recording tape determined in advance.

19. A recording and reproducing apparatus according to claim 11, wherein when said control information is dividedly recorded, the control information is recorded at a position of said magnetic tape determined in advance corresponding to content of the control information.

20. A recording and reproducing apparatus according to claim 19, wherein when data recorded in said magnetic tape and said control information have a connection, the control information connecting with the data is recorded at a position neighboring the connecting data.

21. A recording and reproducing apparatus according to claim 1, wherein when the control information memorized in said cartridge memory and the control information recorded in said recording medium accord, said recording medium is recorded and reproduced, and wherein when the control information memorized in said cartridge memory and the control information recorded in said recording medium do not accord, said recording medium is initialized or only reproduced.

22. A recording and reproducing apparatus according to claim 1, wherein when the control information memorized in said cartridge memory and the control information recorded in said recording medium do not accord, the control information recorded in said recording medium is written in the cartridge memory.

23. A recording and reproducing apparatus according to claim 1, wherein when the control information memorized in said cartridge memory cannot be read, said recording medium is only reproduced.

* * * * *